United States Patent [19]

DeSchepper et al.

[11] 3,883,634

[45] May 13, 1975

[54] LIQUID-LIQUID EXTRACTION OF GERMANIUM FROM AQUEOUS SOLUTION USING HYDROXY-OXIMES

[75] Inventors: Archille DeSchepper, Lichtaart; Antoine Van Peteghem, Olen, both of Belgium

[73] Assignee: Metallurgie Hoboken-Overpelt, Brussels, Belgium

[22] Filed: Apr. 26, 1974

[21] Appl. No.: 464,387

[30] Foreign Application Priority Data
May 14, 1973   Belgium.................................. 67596

[52] U.S. Cl. ...................... 423/89; 423/98; 423/24; 260/566; 75/121; 75/117; 75/101 BE
[51] Int. Cl. ........................ B01d 11/04; C01g 17/00
[58] Field of Search................. 75/121, 117, 101 BE; 23/312 ME, 312 R; 260/566; 423/89, 98, 24

[56] References Cited
OTHER PUBLICATIONS

Nuclear Science Abstracts, Vol. 22, No. 9, pp. 1729, May 15, 1968, No. 16658.
Nuclear Science Abstracts, Vol. 14, No. 18A, pp. 2295, Sept. 30, 1960, No. 17938.
Chemical Abstracts, Vol. 71, 1969, No. 83693t.

*Primary Examiner*—Norman Yudkoff
*Assistant Examiner*—S. J. Emery
*Attorney, Agent, or Firm*—Fred Philpitt

[57] ABSTRACT

Process for extraction of germanium from aqueous acid solution by contacting with an organic liquid containing a hydroxy-oxime and recovering the extracted germanium from the organic phase.

16 Claims, No Drawings

LIQUID-LIQUID EXTRACTION OF GERMANIUM FROM AQUEOUS SOLUTION USING HYDROXY-OXIMES

Certain germanium containing Cu/Pb/Zn sulfide concentrates are processed by subjecting them to a selective roasting during which the germanium is oxidized at the same time as a part of the metals Zn, Fe and Cu. After lixiviation of the roast a sulfuric solution is obtained with a low germanium content. Impure Ge solutions are also obtained from residues of manufacture and from other by-products.

Known methods for concentrating Ge from impure solutions consist in precipitating the Ge as tannate, sulfide or mixed hydroxides. The precipitates are subjected to treatments which end with the distillation of the $GeCl_4$.

The present invention describes a process for separating Ge by liquid-liquid extraction from various acid solution.

It has now been found that Ge may be selectively extracted from acid solutions by means of a hydroxy-oxime and that the extraction capacity of such extractant increases with the acidity.

It is known that organic products containing a hydroxy-oxime can selectively extract copper at a very low acidity, while their extracting power for copper is strongly diminished when the acidity increases.

The selectivity of the Ge extraction, compared to that of the copper, may thus be increased by choosing an appropriate acidity of the solution.

The extractant is also very selective with regard to other metallic ions (only trivalent iron is partially extracted at the same time).

Germanium is extracted from aqueous acid solutions containing metallic or non metallic impurities, by bringing said solution in contact, co-current or counter-currentwise, repeatedly or not, with an organic liquid containing a hydroxy-oxime.

The aqueous solution may contain besides germanium also 10 to 500 g/liter of sulfuric acid or hydrochloric acid, or 10 to 100 g/liter of hydrofluoric acid, as well as other metallic or non-metallic ions at different concentrations.

The organic liquid may consist of hydroxy-oxime, or of a solution of a hydroxy-oxime in an aliphatic solvent and/or an aromatic solvent, and possibly a higher alcohol. The organic liquid will preferelly contain at least 1% by volume of a hydroxy-oxime and up to 10% by volume of a higher alcohol.

It has been found that 19-hydroxyhexatriaconta-9,28 diene-18 oxime, sold under the registered name of LIX-63 (made by "General Mills Inc."Tucson, U.S.A.) is particularly well suited for the extraction of germanium.

It has been noted that aliphatic products, such as kerosene, are well suited as organic solvents for hydroxy-oxime.

A higher alcohol which may advantageously be used is isodecanol.

Examples given below show that the simultaneous extraction of Cu is low. However, copper may previously be eliminated, either by selective cementation in acid medium, or by previous selective extraction, or by any other known method entailing no loss of Ge.

The invention also covers the re-extraction of the Ge from the organic solution by means of water or an acid or alkaline solution. Direct precipitation of the germanium in the organic solution is also possible.

The precipitation may be obtained by adding a gaseous base such as $NH_3$, or a solid base such as lime- or magnesia wash, or a liquid base such as a NaOH or a KOH solution.

After re-extraction of the germanium, the organic solution may be used again for another extraction.

When the starting solutions contain Cu, the latter may be re-extracted after the Ge, by means of an acid solution such as a sulfuric acid solution.

It is thus possible to control the separation selectivity of Ge and Cu by a suitable choice of the operating conditions for the extraction and for the reextraction.

EXAMPLE 1

| Aqueous solution: | | | |
|---|---|---|---|
| | Ge | 5 | g/l |
| | As | 2.68 | g/l |
| | Zn | 4.60 | g/l |
| | Ni | 0.020 | g/l |
| | Cu | 6.79 | g/l |
| | $Fe^{III}$ | 3 | g/l |
| | $Fe_{tot}$ | 59.82 | g/l |
| | Cl | 0.130 | g/l |
| | $H_2SO_4$ | 157 | g/l |

Extraction.
Organic solution: LIX 63 diluted at 50% with kerosene.

$$\text{Ratio } \frac{\text{organic phase}}{\text{aqueous phase}} = \frac{1}{1}.$$

Number of extraction stages: 7.
Raffinate obtained after extraction:

| Ge | 0.019 | g/l |
|---|---|---|
| As | 2.68 | g/l |
| Zn | 4.60 | g/l |
| Ni | 0.02 | g/l |
| Cu | 6.39 | g/l |
| $Fe^{III}$ | 1.5 | g/l |
| $Fe_{tot}$ | 58.3 | g/l |
| Cl | 0.130 | g/l |
| $H_2SO_4$ | 157 | g/l |

Yield of Ge extraction : 99.968%.

2-stage elution

1st stage:
Elution solution : NaOH 175 g/l $$\text{Ratio } \frac{\text{organic phase}}{\text{aqueous phase}} = \frac{40}{1}.$$

Number of elution stages : 6
Germanium-containing eluate :

Ge : 98 g/l
Cu : traces
Fe : 0.45 g/l
NaOH: 67 g/l elution efficiency of Ge : 99%.

2nd stage:
Elution solution : $H_2SO_4$ 200 g/l $$\text{Ratio } \frac{\text{organic phase}}{\text{aqueous phase}} = \frac{40}{1}.$$

Number of elution stages : 2
Eluate obtained after elution :   Ge : traces
                                  Cu : 16 g/l

EXAMPLE 2

Aqueous solution :
| | | |
|---|---|---|
| Ge | 3.5 | g/l |
| Cu | 0.0008 | g/l |
| Zn | 2.5 | g/l |
| Ni | 0.008 | g/l |
| As | 0.79 | g/l |
| $Fe_{tot}$ | 45 | g/l |
| $Fe^{III}$ | 1.5 | g/l |
| $H_2SO_4$ | 460 | g/l |

Extraction
Organic solution : LIX-63 diluted at 30% with kerosene.

Ratio $\dfrac{\text{organic phase}}{\text{aqueous phase}} = \dfrac{1}{1}$

Number of extraction stages : 7
Raffinate obtained after extraction :
| | | |
|---|---|---|
| Ge | 0.007 | g/l |
| Cu | 0.0008 | g/l |
| Zn | 2.5 | g/l |
| Ni | 0.008 | g/l |
| As | 0.79 | g/l |
| $Fe^{III}$ | 0.5 | g/l |
| $Fe_{tot}$ | 44 | g/l |
| $H_2SO_4$ | 460 | g/l |

Yield of Ge extraction : 99.98%.

EXAMPLE 3

Aqueous solution :
| | | |
|---|---|---|
| Ge | 5 | g/l |
| Cu | 0.0008 | g/l |
| Zn | 2.5 | g/l |
| Ni | 0.008 | g/l |
| As | 0.54 | g/l |
| $Fe_{tot}$ | 69 | g/l |
| $Fe^{III}$ | 1.3 | g/l |
| $H_2SO_4$ | 130 | g/l |

Extraction
Organic solution : LIX-63 100%

Ratio $\dfrac{\text{organic phase}}{\text{aqueous phase}} = \dfrac{1}{1}$

Number of extraction stages : 4
Raffinate obtained after extraction :
| | | |
|---|---|---|
| Ge | 0.002 | g/l |
| Cu | 0.0008 | g/l |
| Zn | 2.47 | g/l |
| Ni | 0.008 | g/l |
| As | 0.48 | g/l |
| $Fe_{tot}$ | 67.3 | g/l |
| $Fe^{III}$ | traces | |
| $H_2SO_4$ | 130 | g/l |

Yield of Ge extraction : 99.99%.

What we claim is:

1. A process for liquid-liquid extraction of germanium from an aqueous solution, in which an organic liquid containing hydroxy-oxime is used as extractant comprising contacting an aqueous solution containing germanium and an acid selected from the group consisting of 10 to 500 grams per liter of hydrochloric acid, 10 to 500 grams per liter of sulfuric acid, and 10 to 100 grams per liter of hydrofluoric acid, with an organic liquid selected from the group consisting of non-diluted hydroxy-oxime, a solution of hydroxy-oxime in an aliphatic solvent, a solution of hydroxy-oxime in an aromatic solvent, and a solution of hydroxy-oxime in a mixture of an aliphatic and an aromatic solvent, separating the organic liquid phase containing extracted germanium from the residual aqueous phase, and recovering the extracted germanium from the separated organic phase by contacting with an agent selected from the group consisting of water, acids, and bases.

2. A process as claimed in claim 1, in which the aqueous solution contains 10 to 500 g/l of an acid chosen in the class consisting of sulfuric acid and hydrochloric acid.

3. A process as claimed in claim 1, in which the aqueous solution contains 10 to 100 g/l hydrofluoric acid.

4. A process as claimed in claim 1, in which a non-diluted hydroxy-oxime is used as the organic liquid.

5. A process as claimed in claim 1, in which a solution of a hydroxy-oxime in an aliphatic solvent is used as the organic liquid.

6. A process as claimed in claim 1, in which a solution of a hydroxy-oxime in an aromatic solvent is used as the organic liquid.

7. A process as claimed in claim 5, in which a higher alcohol is added to the hydroxy-oxime solution.

8. A process as claimed in claim 5, in which the organic liquid contains at least 1% by volume of a hydroxy-oxime.

9. A process as claimed in claim 6, in which the organic liquid contains up to 10% by volume of a higher alcohol.

10. A process as claimed in claim 1, in which 19-hydroxyhexatriaconta-9,28 diene-18-oxime is used as hydroxy-oxime.

11. A process as claimed in claim 5, in which kerosene is used as the solvent.

12. A process as claimed in claim 7, in which isodecanol is used as the higher alcohol.

13. A process as claimed in claim 1, in which the separated organic phase is regenerated by contacting it with a base, and is used again for another extraction.

14. A process as claimed in claim 13, in which use is made as a base of an aqueous solution of a compound selected from the group consisting of NaOH, KOH, limewash, magnesiawash, and ammonia.

15. A process as claimed in claim 1, in which the aqueous solution contains copper.

16. A process as claimed in claim 15, in which the separated organic phase is regenerated first by contacting it with a base in order to separate the germanium, and afterwards with an acid solution in order to separate the copper, and is used again for another extraction.

* * * * *

UNITED STATES PATENT OFFICE
CERTIFICATE OF CORRECTION

PATENT NO. : 3,883,634
DATED : May 13, 1975
INVENTOR(S) : Achille DE SCHEPPER et al It is certified that error appears in the above-identified patent and that said Letters Patent are hereby corrected as shown below:

Column 2, line 55, "$\frac{40}{1}$" should be --- $\frac{20}{1}$ ---

Signed and Sealed this fifth Day of August 1975

[SEAL]

Attest:

RUTH C. MASON
*Attesting Officer*

C. MARSHALL DANN
*Commissioner of Patents and Trademarks*